US010365752B2

(12) United States Patent
Liu et al.

(10) Patent No.: US 10,365,752 B2
(45) Date of Patent: Jul. 30, 2019

(54) TOUCH-CONTROL DISPLAY PANEL AND TOUCH-CONTROL DISPLAY DEVICE

(71) Applicants: Shanghai Tianma Micro-electronics Co., Ltd., Shanghai (CN); Tianma Micro-electronics Co., Ltd., Shenzhen (CN)

(72) Inventors: Liang Liu, Shanghai (CN); Feng Lu, Shanghai (CN); Shaolong Ma, Shanghai (CN); Qijun Yao, Shanghai (CN); Xingyao Zhou, Shanghai (CN)

(73) Assignees: Shanghai Tianma Micro-electronics Co., Ltd., Shanghai (CN); Tianma Micro-electronics Co., Ltd., Shenzhen (CN)

( * ) Notice: Subject to any disclaimer, the term of this patent is extended or adjusted under 35 U.S.C. 154(b) by 1 day.

(21) Appl. No.: 15/269,797

(22) Filed: Sep. 19, 2016

(65) Prior Publication Data

US 2017/0010742 A1    Jan. 12, 2017

(30) Foreign Application Priority Data

Jul. 7, 2016  (CN) .......................... 2016 1 0531624

(51) Int. Cl.
*G06F 3/041*    (2006.01)
*G06F 3/045*    (2006.01)
*G02F 1/1333*   (2006.01)

(52) U.S. Cl.
CPC ............ *G06F 3/0416* (2013.01); *G06F 3/045* (2013.01); *G06F 3/0414* (2013.01);
(Continued)

(58) Field of Classification Search
CPC ...... G06F 3/0416; G06F 3/045; G06F 3/0412; G06F 3/0414; G06F 2203/04107; G06F 3/0418; H01L 27/323; G02F 1/13338
See application file for complete search history.

(56) References Cited

U.S. PATENT DOCUMENTS 6,098,464 A * 8/2000 Avisse ................... G01D 3/036
324/648
7,592,803 B1    9/2009 Guo et al.
(Continued)

FOREIGN PATENT DOCUMENTS

CN       1203662 A    12/1998
CN     104641326 A     5/2015
(Continued)

*Primary Examiner* — Temesghen Ghebretinsae
*Assistant Examiner* — Ivelisse Martinez Quiles
(74) *Attorney, Agent, or Firm* — Anova Law Group, PLLC

(57) ABSTRACT

A touch control display panel and a touch control display device are provided. The touch control display panel comprises a substrate having a first extending direction and a second extending direction; and at least one force sensing bridge including a first sensing resistor, a second sensing resistor, a third sensing resistor, and a fourth sensing resistor. The first sensing resistor has a longer extending length in the first extending direction than in the second extending direction. The second sensing resistor has a longer extending length in the second extending direction than in the first extending direction. The third sensing resistor has a longer extending length in the first extending direction than in the second extending direction. The fourth sensing resistor has a longer extending length in the second extending direction than in the first extending direction.

20 Claims, 12 Drawing Sheets

(52) U.S. Cl.
CPC ........ *G06F 3/0418* (2013.01); *G02F 1/13338* (2013.01); *G06F 2203/04107* (2013.01)

(56) References Cited

U.S. PATENT DOCUMENTS

| | | | | |
|---|---|---|---|---|
| 2004/0124018 A1* | 7/2004 | Yanagi | ................... | B60N 2/002 177/144 |
| 2009/0143923 A1* | 6/2009 | Breed | ..................... | G08G 1/205 701/1 |
| 2009/0282930 A1* | 11/2009 | Cheng | ...................... | G01L 1/18 73/862.627 |
| 2010/0201635 A1* | 8/2010 | Klinghult | .............. | G06F 3/0414 345/173 |
| 2012/0125114 A1* | 5/2012 | Stewart | ................ | G01L 9/0054 73/721 |
| 2013/0009905 A1* | 1/2013 | Castillo | ................... | G06F 3/044 345/174 |
| 2013/0154998 A1* | 6/2013 | Yang | ................. | H03K 17/9625 345/174 |
| 2015/0135857 A1 | 5/2015 | Kawamura et al. | | |
| 2016/0041672 A1* | 2/2016 | Hoen | ..................... | G06F 3/041 345/173 |
| 2016/0103545 A1* | 4/2016 | Filiz | .......................... | G01L 1/18 345/174 |
| 2016/0147353 A1* | 5/2016 | Filiz | ..................... | G06F 3/0414 345/174 |
| 2017/0010704 A1* | 1/2017 | Chen | ..................... | G06F 3/0412 |
| 2017/0261306 A1* | 9/2017 | Ausserlechner | ......... | G01B 7/18 |
| 2017/0277296 A1* | 9/2017 | Reynolds | .............. | G06F 3/0412 |
| 2017/0285864 A1* | 10/2017 | Pedder | .................. | G06F 3/0412 |
| 2017/0329448 A1* | 11/2017 | Li | ......................... | G06F 3/0412 |
| 2018/0046277 A1* | 2/2018 | Ding | ..................... | G06F 3/0412 |
| 2018/0107322 A1* | 4/2018 | Liu | ...................... | G06F 3/0414 |
| 2018/0113556 A1* | 4/2018 | Wang | ................... | G06F 3/0412 |

FOREIGN PATENT DOCUMENTS

| | | | | |
|---|---|---|---|---|
| CN | 105181217 A | | 12/2015 | |
| CN | 105739788 A | | 7/2016 | |
| DE | 19825761 A1 | * | 12/1999 | ............... G01B 7/20 |
| EP | 0964252 A1 | | 12/1999 | |
| WO | WO 2017132968 A1 | * | 8/2017 | ............ G06F 3/041 |

* cited by examiner

TOUCH-CONTROL DISPLAY PANEL AND TOUCH-CONTROL DISPLAY DEVICE

CROSS-REFERENCES TO RELATED APPLICATIONS

This application claims priority of Chinese Patent Application No. 201610531624.5, filed on Jul. 7, 2016, the entire contents of which are hereby incorporated by reference.

FIELD OF THE INVENTION

The present disclosure generally relates to the field of display technology and, more particularly, relates to a touch control display panel and a touch control display device thereof.

BACKGROUND

Display panels with a touch control function, i.e., touch control display panels, have been widely used as information input tools in various electronic devices, such as a mobile phone, a tablet PC, and a public information kiosk, etc. Accordingly, a user is able to operate the electronic device by touching corresponding icons on the touch control display panel with his/her finger, eliminating the dependence on conventional user input devices (such as a keyboard and mouse, etc.) and simplifying the human-machine interaction.

To better fulfill the needs of users, the touch control display panel also includes a plurality of force sensors, which are capable of detecting a magnitude of an external force applied onto the touch control display panel. Thus, the touch control display panel not only detects the touch positions, but also identifies the magnitude of the external force, i.e., realizing a force touch. Force touch distinguishes force or touch pressure between taps and harder presses, and provides a specific action or contextually specific controls based on the force applied an external touch object (e.g., a user's finger) and, thus, brings new dimensions to user interfaces and interactive computing.

However, in current touch control display panels, the force touch may be affected by a local temperature change, and the accuracy of the force touch may be substantially low. For example, when the user's finger taps or presses the touch control display panel, the touch position may experience a local temperature change because of a heat transfer from the user's finger to the touch position.

The disclosed touch control display panel and touch control display device thereof are directed to solve one or more problems set forth above and other problems.

BRIEF SUMMARY OF THE DISCLOSURE

One aspect of the present disclosure provides a touch control display panel. The touch control display panel comprises a substrate having a first extending direction and a second extending direction intersecting the first extending direction. The touch control display panel also comprises at least one force sensing bridge including a first sensing resistor, a second sensing resistor, a third sensing resistor, and a fourth sensing resistor. A first end of the first sensing resistor and a first end of the fourth sensing resistor are electrically connected to an input terminal of a first power supply, respectively. A second end of the first sensing resistor and a first end of the second sensing resistor are electrically connected to a first sensing signal measurement terminal, respectively. A second end of the fourth sensing resistor and a first end of the third sensing resistor are electrically connected to a second sensing signal measurement terminal, respectively. A second end of the second sensing resistor and a second end of the third sensing resistor are electrically connected to an input terminal of a second power supply, respectively. From the first end to the second end of the first sensing resistor, the first sensing resistor has a longer extending length in the first extending direction than in the second extending direction. From the first end to the second end of the second sensing resistor, the second sensing resistor has a longer extending length in the second extending direction than in the first extending direction. From the first end to the second end of the third sensing resistor, the third sensing resistor has a longer extending length in the first extending direction than in the second extending direction. From the first end to the second end of the fourth sensing resistor, the fourth sensing resistor has a longer extending length in the second extending direction than in the first extending direction.

Another aspect of the present disclosure provides a touch control display device. The touch control display device comprises a touch control display panel. The touch control display panel comprises a substrate having a first extending direction and a second extending direction intersecting the first extending direction. The touch control display panel also comprises at least one force sensing bridge including a first sensing resistor, a second sensing resistor, a third sensing resistor, and a fourth sensing resistor. A first end of the first sensing resistor and a first end of the fourth sensing resistor are electrically connected to an input terminal of a first power supply, respectively, a second end of the first sensing resistor and a first end of the second sensing resistor are electrically connected to a first sensing signal measurement terminal, respectively. A second end of the fourth sensing resistor and a first end of the third sensing resistor are electrically connected to a second sensing signal measurement terminal, respectively. A second end of the second sensing resistor and a second end of the third sensing resistor are electrically connected to an input terminal of a second power supply, respectively. From the first end to the second end of the first sensing resistor, the first sensing resistor has a longer extending length in the first extending direction than in the second extending direction. From the first end to the second end of the second sensing resistor, the second sensing resistor has a longer extending length in the second extending direction than in the first extending direction. From the first end to the second end of the third sensing resistor, the third sensing resistor has a longer extending length in the first extending direction than in the second extending direction. From the first end to the second end of the fourth sensing resistor, the fourth sensing resistor has a longer extending length in the second extending direction than in the first extending direction.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention. Further, in the present disclosure, the disclosed embodiments and the features of the disclosed embodiments may be combined under conditions without conflicts.

To enable a force touch in current touch control display panels, a plurality of force sensors, which are capable of detecting a touch force applied to the touch control display panels, are often disposed at corners of the touch control display panel. The force sensor may be a strain gauge, which is a thin layer of strain sensitive circuitry. When being pressed on, the strain gauge becomes thinner, which is recorded by a microcontroller and translated into a force value by a calibration curve. However, because the resistance also changes with the temperature in addition to the applied touch force, for example, a region touched by the user's finger may have a higher temperature than a non-touched region, the measurement accuracy of the resistance may be affected by the temperature. Accordingly, the translated force value may also be affected.

Figure 1:
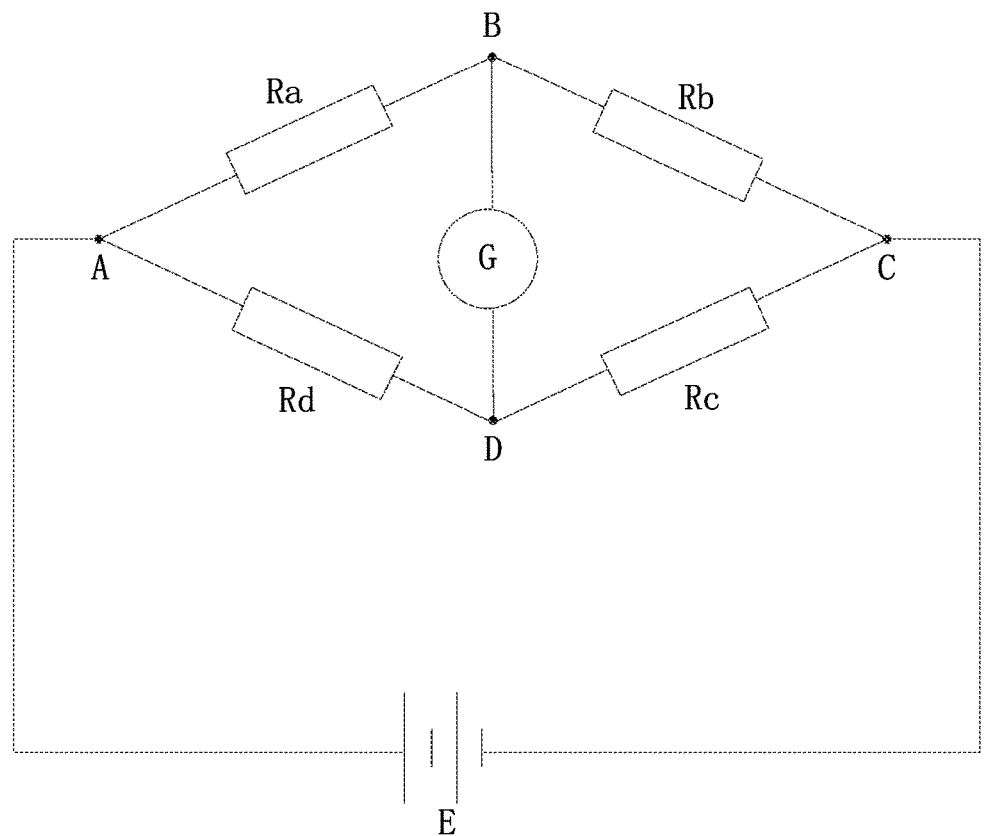
FIG. 1 illustrates an equivalent circuit diagram of a Wheatstone bridge.

To compensate the temperature effect on the resistance, a Wheatstone bridge may be used as the force sensor. FIG. 1 illustrates an equivalent circuit diagram of a Wheatstone bridge. As shown in FIG. 1, the current Wheatstone bridge includes four resistors Ra, Rb, Rc, Rd, which form a quadrilateral ABCD and are known as four arms of the bridge. Two arms Ra and Rb form a leg of the Wheatstone bridge, and the other two arms Rc and Rd form another leg of the Wheatstone bridge. A galvanometer G is connected between the two midpoints B and D, which is known as the bridge. A power supply E is connected between the two midpoints A and C.

When the power supply E is turned on and the resistance of the resistors Ra, Rb, Rc, Rd satisfy a bridge balance condition, i.e., Ra/Rb=Rd/Rc, the voltage between the two midpoints B and D is zero and no current flows through the galvanometer G, i.e., the galvanometer G has a reading of zero, which is called as a balanced state. When the resistance of the resistors Ra, Rb, Rc, Rd do not satisfy the bridge balance condition, the voltage between the two midpoints B and D is not zero and current flows through the galvanometer G. Accordingly, the galvanometer G has a reading larger than zero, and sends out a corresponding signal value.

When the Wheatstone bridge is placed on the touch control display panel and an external force is applied onto the touch control display panel, the resistors Ra, Rb, Rc, Rd are deformed and, accordingly, the resistance is changed, the Wheatstone bridge is no longer in the balanced state, and the galvanometer G gives a corresponding signal value. Due to a correspondence between the magnitude of the external force and the corresponding signal value given by the galvanometer G, the magnitude of the external force applied onto the touch control display panel may be obtained according to the signal value given by the galvanometer G. In particular, when the resistors Ra, Rb, Rc, Rd experience a same temperature change, the reading of the galvanometer G may remain substantially the same, and the temperature effect on the resistance may be compensated.

However, to detect strains in different directions in the touch control display panel and increase the sensitivity of force touch, the current Wheatstone bridge often requires the resistors in the same leg, i.e., Ra and Rb (Rc and Rd), to experience a different deformation, for example, Ra (Rc) has to experience a compressing deformation, while Rb (Rd) has to experience a stretching deformation. Thus, Ra and Rb (Rc and Rd) may have to be well separated from each other.

When the region disposed with Ra (Rc) is touched by the finger while the region disposed with Rb (Rd) is not touched, the region disposed with Ra (Rc) may have a higher temperature than the region disposed with Rb (Rd), i.e., the resistor Ra (Rc) may have a temperature different from the resistor Rb (Rd). Thus, the current Wheatstone bridge may fail to compensate the temperature effect in measuring the external force applied onto the touch control display panel, and the corresponding force sensors may be less applicable in the practical applications.

Figure 2A:
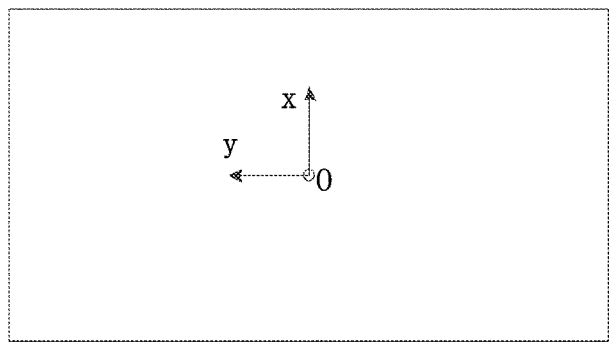
FIG. 2a illustrates a top view of a current touch control display panel.
Figure 2B:
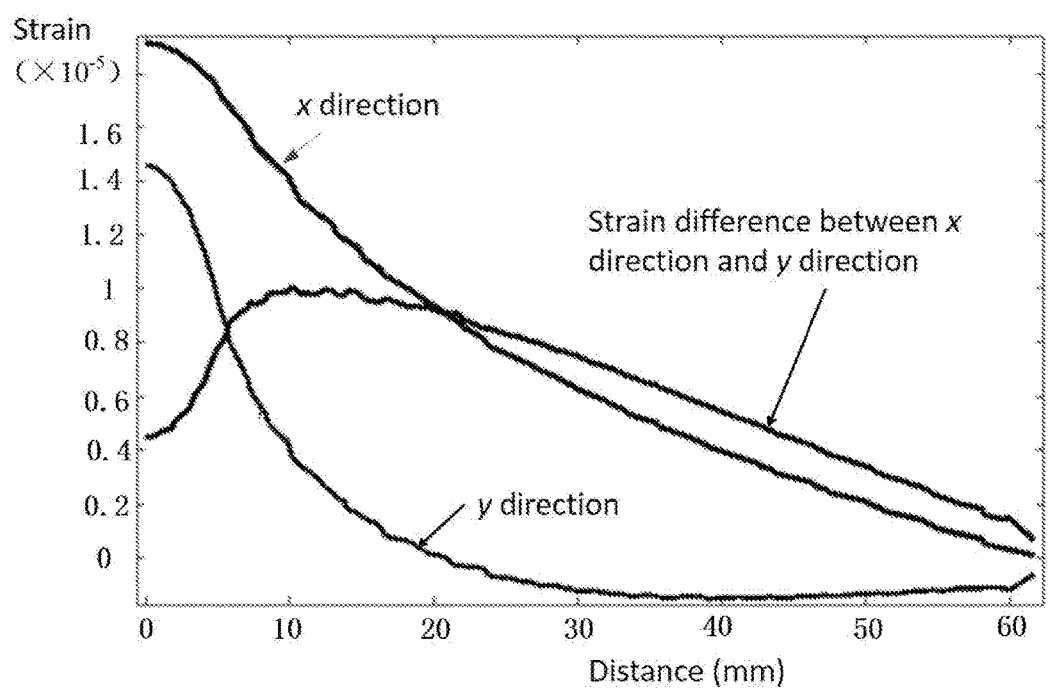
FIG. 2b illustrates strains in a current touch control display panel after being pressed.

On the other hand, in the current touch control display panel, applying an external force to a point on the touch control display panel may cause different strains in different directions within the touch control display panel. FIG. 2a illustrates a top view of a current touch control display panel. FIG. 2b illustrates strains in a current touch control display panel after being pressed. Referring to FIG. 2a, a touching point is set as the origin, and an x-y coordinate system is created. Referring to FIG. 2b, the horizontal axis denotes a distance between a detecting position and the touching point O, and the vertical axis denotes a strain. The touching point O may cause different strains in the x direction and y direction, i.e., the touching point O may cause different strains in different directions within the touch control display panel.

According to the above discussion, the present disclosure provides an improved touch control display panel. The touch control display panel may comprise at least one force sensing bridge including a plurality of resistors, and the resistors in a same leg of the force sensing bridge may be disposed in a same area, or confined in a substantially small area on the touch control display panel, in which a local temperature of the resistors may be the same or substantially the same That is, a local temperature difference on the resistors disposed in the same area or in the substantially small area may be neglected. Thus, the temperature effect in measuring the external force applied onto the touch control display panel may be reduced, while the accuracy of the force touch may be improved.

Figure 3:
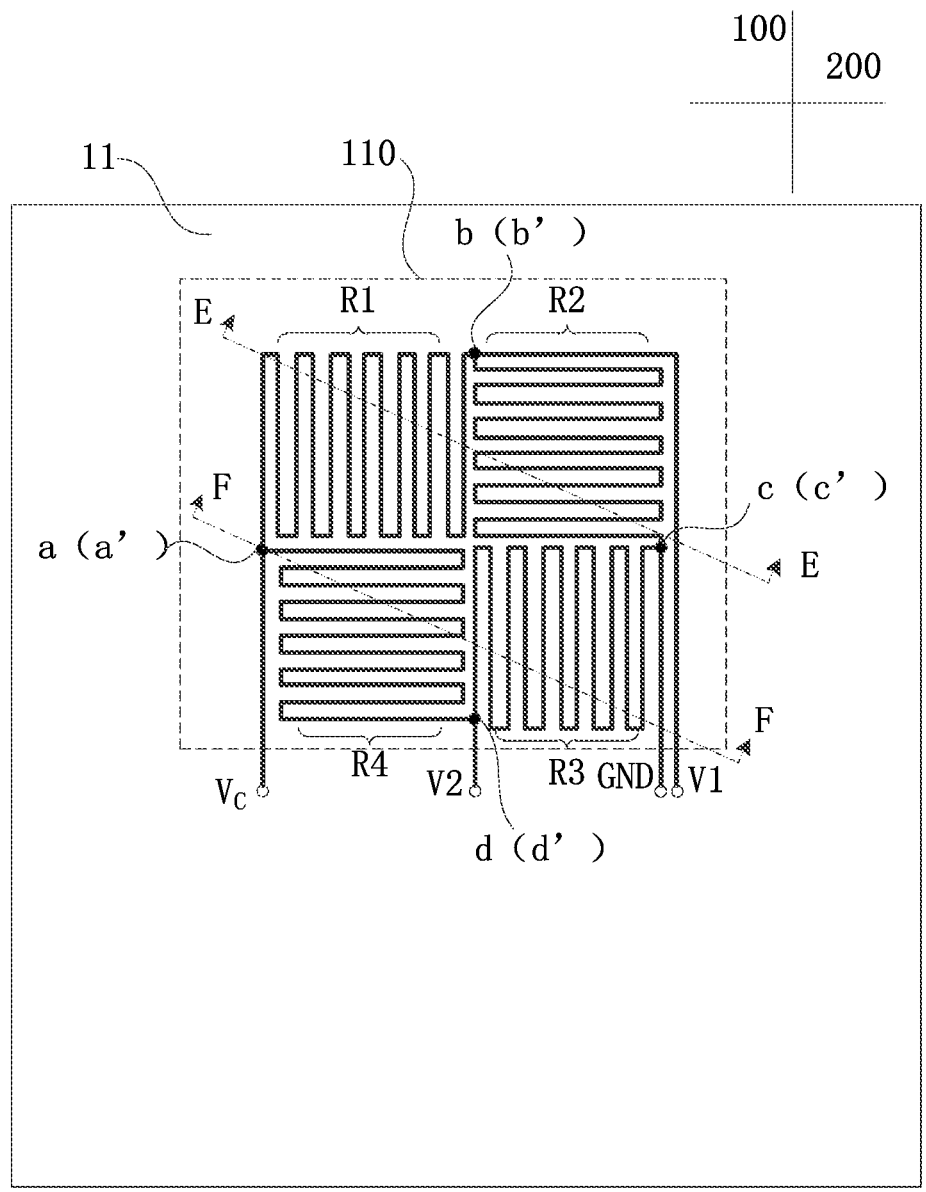
FIG. 3 illustrates a partial diagram of an exemplary touch control display panel consistent with disclosed embodiments.

FIG. 3 illustrates a partial diagram of an exemplary touch control display panel consistent with disclosed embodiments. As shown in FIG. 3, the touch control display panel may include a substrate 11 and at least one force sensing bridge 110 disposed on the substrate 11. The substrate 11 may have a first extending direction 100 and a second extending direction 200, and the second extending direction 200 may intersect the first extending direction 100. The force sensing bridge 110, which may include a first sensing resistor R1, a second sensing resistor R2, a third sensing resistor R3 and a fourth sensing resistor R4. The first sensing resistor R1 and the second sensing resistor R2 may form one leg of the force sensing bridge 110, and the third sensing resistor R3 and the fourth sensing resistor R4 may form another leg of the force sensing bridge 110.

A first end a of the first sensing resistor R1 and a first end a' of the fourth sensing resistor R4 may be electrically connected to an input terminal Vc of a first power supply, respectively. A second end b of the first sensing resistor R1 and a first end b' of the second sensing resistor R2 may be electrically connected to a first sensing signal measurement terminal V1, respectively. A second end d of the fourth sensing resistor R4 and a first end d' of the third sensing resistor R3 may be electrically connected to a second sensing signal measurement terminal V2, respectively. A second end c of the second sensing resistor R2 and a second end c' of the third sensing resistor R3 may be electrically connected to an input terminal GND of a second power supply, respectively.

From the first end a to the second end b of the first sensing resistor R1, the first sensing resistor R1 may have a longer extending length in the first extending direction 100 than in the second extending direction 200. For example, in one embodiment, as shown in FIG. 3, the first sensing resistor R1 may have a folded linear structure, which may include two portions: one portion extending in the first extending direction 100 and the other portion extending in the second extending direction 200. From the first end a to the second end b of the first sensing resistor R1, the portion extending in the first extending direction 100 may be longer than the other portion extending in the second extending direction 200.

From the first end b' to the second end c of the second sensing resistor R2, the second sensing resistor R2 may have a longer extending length in the second extending direction 200 than in the first extending direction 100. For example, in one embodiment, as shown in FIG. 3, the second sensing resistor R2 may have a folded linear structure, which may include two portions: one portion extending in the first extending direction 100 and the other portion extending in the second extending direction 200. From the first end b' to the second end c of the second sensing resistor R2, the portion extending in the second extending direction 200 may be longer than the other portion extending in the first extending direction 100.

From the first end d' to the second end c' of the third sensing resistor R3, the third sensing resistor R3 may have a longer extending length in the first extending direction 100 than in the second extending direction 200. For example, in one embodiment, as shown in FIG. 3, the third sensing resistor R3 may have a folded linear structure, which may include two portions: one portion extending in the first extending direction 100 and the other portion extending in the second extending direction 200. From the first end d' to the second end c' of the third sensing resistor R3, the portion extending in the first extending direction 100 may belonger than the other portion extending in the second extending direction 200.

From the first end a' to the second end d of the fourth sensing resistor R4, the fourth sensing resistor R4 may the second sensing resistor R2 may have a longer extending length in the second extending direction 200 than in the first extending direction 100. For example, in one embodiment, as shown in FIG. 3, the fourth sensing resistor R4 may have a folded linear structure, which may include two portions: one portion extending in the first extending direction 100 and the other portion extending in the second extending direction 200. From the first end a' to the second end d of the fourth sensing resistor R4, the portion extending in the second extending direction 200 may be longer than the other portion extending in the first extending direction 100.

In particular, the first sensing resistor R1 and the third sensing resistor R3 may respectively detect a strain in the first extending direction 100, and the second sensing resistor R2 and fourth sensing resistor R4 may respectively detect a strain in the second extending direction 200. At least the resistors in a same leg of the force sensing bridge 110 may be disposed in a same area, or at least confined in a substantially small area on the touch control display panel, in which a local temperature of the resistors may be the same or substantially the same.

That is, the first sensing resistor R1 and the second sensing resistor R2 may be disposed in a same area, or at least confined in a substantially small area on the touch control display panel, in which the local temperature change may be the same or substantially the same. Meanwhile, the third sensing resistor R3 and the fourth sensing resistor R4 may be disposed in a same area or confined in a substantially small area, in which the local temperature change may be the same or substantially the same.

Thus, the first sensing resistor R1 and the second sensing resistor R2 may experience a same temperature change, and the third sensing resistor R3 and the fourth sensing resistor R4 may also experience a same temperature change. Accordingly, the temperature effect in measuring the force applied onto the touch control display panel may be reduced, while the strains in the substrate 11 may be still successfully detected. In addition, the measurement accuracy the force applied onto the touch control display panel may be improved, i.e., the accuracy of the force touch may be improved.

In certain embodiments, all the resistors in the force sensing bridge 110 (i.e., R1-R4) may be disposed in a same area, or may be confined in a substantially small area on the touch control display panel, in which a local temperature of the resistors may be the same or substantially the same. Thus, the temperature effect in measuring the force applied onto the touch control display panel may be reduced, while the strains in the substrate 11 may be still successfully detected, and the accuracy of the force touch may be improved.

Further, the substrate 11 may have various shapes, such as a rectangular shape, a circular shape, an elliptical shape, and a diamond shape, etc. In one embodiment, as shown in FIG. 3, the substrate 11 may have a rectangular shape, the first extending direction 100 may be along the long side of the rectangular shape, and the second extending direction 200 may be along the short side of the rectangular shape. The first extending direction 100 may be perpendicular to the second extending direction 200, i.e., an angle between the first extending direction 100 and the second extending direction 200 may be approximately 90°. In another embodiment, the first extending direction 100 may be no longer perpendicular to the second extending direction 200, i.e., an angle between the first extending direction 100 and the second extending direction 200 may be different from 90°.

Figure 4:
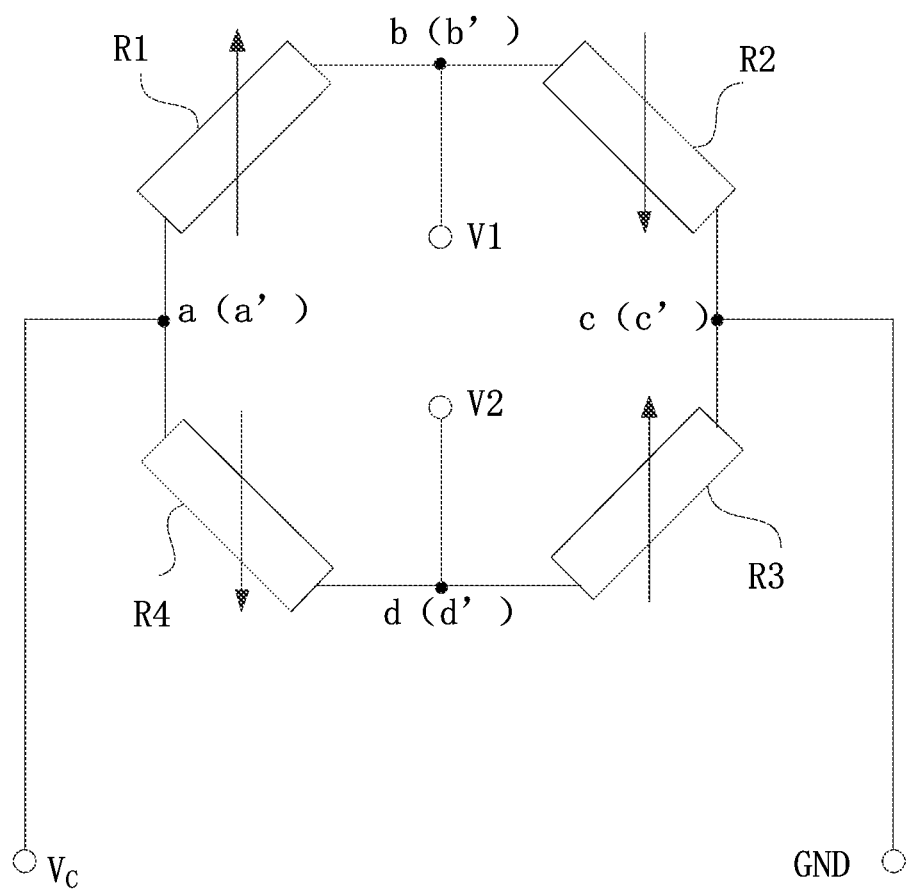
FIG. 4 illustrates an equivalent circuit diagram of a force sensing bridge in an exemplary touch control display panel in FIG. 3 consistent with disclosed embodiments.

FIG. 4 illustrates an equivalent circuit diagram of a force sensing bridge in an exemplary touch control display panel in FIG. 3 consistent with disclosed embodiments. Referring to FIG. 3 and FIG. 4, an electric signal may be applied to the first sensing resistor R1, the second sensing resistor R2, the third sensing resistor R3 and the fourth sensing resistor R4 though the input terminal Vc of the first power supply and the input terminal GND of the second power supply.

Without an external force (e.g., a touch) applied onto the touch control display panel, the initial resistance of the first sensing resistor R1, the second sensing resistor R2, the third sensing resistor R3, and the fourth sensing resistor R4 may satisfy a bridge balance condition (i.e., R1/R2=R4/R3). Accordingly, the force sensing bridge 110 may be in a balanced state, and an output signal between the first sensing signal measurement terminal V1 and the second sensing signal measurement terminal V2 may be zero, i.e., an output of the force sensing bridge may be zero.

When touched by the user's finger, the touch control display panel 11 may experience a deformation. Then, the first sensing resistor R1 and the third sensing resistor R3 may detect a strain in the first extending direction 100, and the resistance of the first sensing resistor R1 and the third sensing resistor R3 may be changed. The second sensing resistor R2 and the fourth sensing resistor R4 may detect a strain in the second extending direction 200, and the resistance of the second sensing resistor R2 and fourth sensing resistor R4 may be changed.

Because the strain in the first extending direction 100 may be different from the strain in the second extending direction 200, the first sensing resistor R1 may have a resistance change different from the second sensing resistor R2, while the third sensing resistor R3 may have a resistance change different from the fourth sensing resistor R4. Thus, the resistance of the first sensing resistor R1, the second sensing resistor R2, the third sensing resistor R3, and the fourth sensing resistor R4 may no longer satisfy the bridge balance condition. Accordingly, the force sensing bridge 110 may be no longer in a balanced state, and the output signal between the first sensing signal measurement terminal V1 and the second sensing signal measurement terminal V2 may be no longer zero, i.e., i.e., an output of the force sensing bridge may be no longer zero.

After reading the output signal between the first sensing signal measurement terminal V1 and the second sensing signal measurement terminal V2, the magnitude of the external force applied onto the touch control display panel may be calculated based on the output signal between the first sensing signal measurement terminal V1 and the second sensing signal measurement terminal V2. Measuring the magnitude of the applied external force may enable a touch, release, drag or drop operation in the touch control display panel.

It should be noted that, the output of the force sensing bridge may be a current or a voltage. FIG. 3 illustrates the first extending direction 100 is perpendicular to the second extending direction 200, which is for illustrative purposes and is not intended to limit the scope of the present disclosure. In another embodiment, the first extending direction 100 may be no longer perpendicular to the second extending direction 200, i.e., an angle between the first extending direction 100 and the second extending direction 200 may be different from 90°.

Further, the resistors in the same leg of the force sensing bridge may have substantially same initial resistance or base resistance. That is, the first sensing resistor R1 and the second sensing resistor R2 may have substantially same initial resistance, and the third sensing resistor R3 and the fourth sensing resistor R4 may have substantially same initial resistance. Thus, the output of the force sensing bridge without the applied force may be reduced, and the measurement accuracy of the output of the force sensing bridge with the applied force may be improved.

In one embodiment, the first sensing resistor R1, the second sensing resistor R2, the third sensing resistor R3, and the fourth sensing resistor R4 may have the same initial resistance, and the output of the force sensing bridge without the applied force may be zero. Thus, even a substantially small output of the force sensing bridge caused by a small strain change may be detected by the force sensing bridge 110, and the measurement accuracy of the output of the force sensing bridge with the applied force may be significantly improved.

Referring to FIG. 3, at least one of the first sensing resistor R1, the second sensing resistor R2, the third sensing resistor R3, and the fourth sensing resistor R4 may have a folded linear structure. On one hand, the folded linear structure may allow a substantially large initial resistance of the sensing resistor and, meanwhile, reduce the size of the sensing resistor, such that the sensing resistor may be able to be disposed within a substantially small area and the temperature difference across the sensing resistor may be eliminated. On the other hand, the folded linear structure may increase the contact area between the sensing resistor and the substrate 11, such that the sensing resistor may be able to detect the strains in the substrate 11 more accurately, which may improve the accuracy of the force touch.

Figure 5:
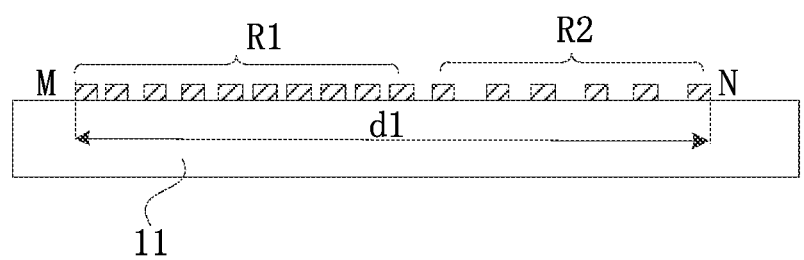
FIG. 5 illustrates a sectional view of an exemplary touch control display panel in FIG. 3 along the E-E direction consistent with disclosed embodiments.
Figure 6:
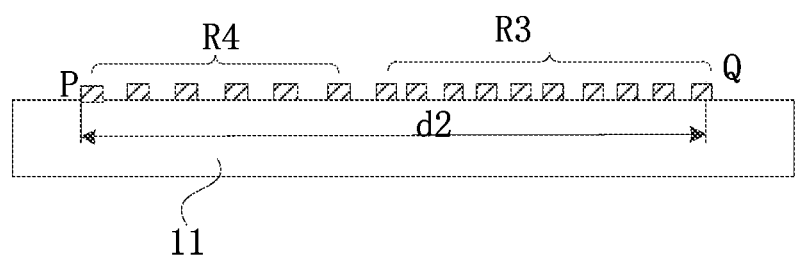
FIG. 6 illustrates a sectional view of an exemplary touch control display panel in FIG. 3 along the F-F direction consistent with disclosed embodiments.

FIG. 5 illustrates an E-E sectional view of an exemplary touch control display panel in FIG. 3 consistent with disclosed embodiments. FIG. 6 illustrates an F-F sectional view of an exemplary touch control display panel in FIG. 3 consistent with disclosed embodiments. In one embodiment, as shown in FIG. 3 and FIGS. 5-6, the first sensing resistor R1, the second sensing resistor R2, the third sensing resistor R3, and the fourth sensing resistor R4 may be disposed in the same layer. In another embodiment, the first sensing resistor R1, the second sensing resistor R2, the third sensing resistor R3, and the fourth sensing resistor R4 may be disposed in different layers.

As discussed above, to allow the temperature of the first sensing resistor R1 and the second sensing resistor R2 to change simultaneously, the first sensing resistor R1 and the second sensing resistor R2 may be confined in a substantially small area. For example, in one embodiment, as shown in FIG. 5, a distance d1 between a first point M and a second point N may be approximately 0.1 mm~5 mm, in which the first point M may be the farthest point of the first sensing resistor R1 away from the second sensing resistor R2, and the second point N may be the farthest point of the second sensing resistor R2 away from the first sensing resistor R1.

Similarly, to allow the temperature of the third sensing resistor R3 and the fourth sensing resistor R4 to change simultaneously, the third sensing resistor R3 and the fourth sensing resistor R4 may be confined in a substantially small area. For example, in one embodiment, as shown in FIG. 6, a distance d2 between a third point Q and a fourth point P may be approximately 0.1 mm~5 mm, in which the third point Q may be the farthest point of the third sensing resistor R3 away from the fourth sensing resistor R4, and the fourth point P may be the farthest point of the fourth sensing resistor R4 away from the third sensing resistor R3.

In the disclosed embodiments, by confining the first sensing resistor R1 and the second sensing resistor R2 to a substantially small area, the temperature of the first sensing resistor R1 and the second sensing resistor R2 may be changed simultaneously. Similarly, by confining the third sensing resistor R3 and the fourth sensing resistor R4 to a substantially small area, the temperature of the third sensing resistor R3 and the fourth sensing resistor R4 may be changed simultaneously. Thus, the temperature difference between the first sensing resistor R1 and the second sensing resistor R2, as well as, the temperature difference between the third sensing resistor R3 and the fourth sensing resistor R4 may be reduced, while the stains in the substrate caused by the applied external force may be successfully detected, and the accuracy of the force touch may be improved.

It should be noted that, the positions of the first point M and the second point N shown in FIG. 5, and the positions of the third point Q and the fourth point P shown in FIG. 6 are for illustrative purposes and is not intended to limit the scope of the present disclosure.

Figure 7A:
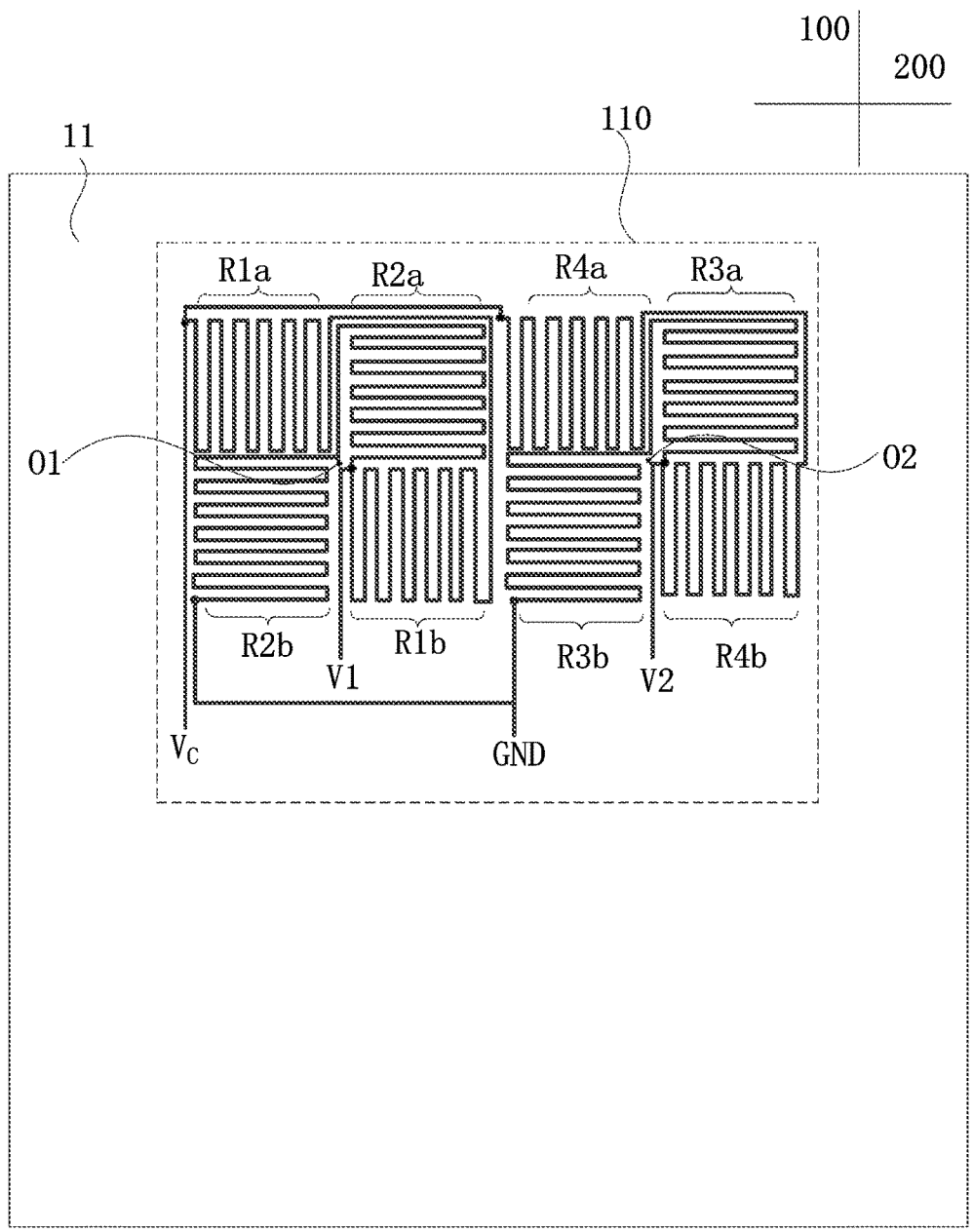
FIG. 7a illustrates a partial diagram of another exemplary touch control display panel consistent with disclosed embodiments.

FIG. 7a illustrates a partial diagram of another exemplary touch control display panel consistent with disclosed embodiments. The similarities between FIG. 7a and FIG. 3 are not repeated here, while certain differences may be explained. As shown in FIG. 7a, the force sensing bridge 110 may include a first sensing resistor R1, a second sensing resistor R2, a third sensing resistor R3 and a fourth sensing resistor R4. The first sensing resistor R1 may include at least two first-sensing-resistor units connected in series: R1a and R1b. The second sensing resistor R2 may include at least two second-sensing-resistor units connected in series: R2a and R2b. The third sensing resistor R3 may include at least two third-sensing-resistor units connected in series: R3a and R3b. The fourth sensing resistor R4 may include at least two fourth-sensing-resistor units connected in series: R4a and R4b.

In particular, the at least two first-sensing-resistor units connected in series (i.e., R1a and R1b) and the at least two second-sensing-resistor units connected in series (i.e., R2a and R2b) may be alternately arranged, the at least two first-sensing-resistor units connected in series (i.e., R1a and R1b) may be symmetrical with respect to a first center point O1, and the at least two second-sensing-resistor units connected in series (i.e., R2a and R2b) may be symmetrical with respect to the first center point O1.

Meanwhile, the at least two third-sensing-resistor units connected in series (i.e., R3a and R3b) and the at least two fourth-sensing-resistor units connected in series (i.e., R4a and R4b) may be alternately arranged, the at least two third-sensing-resistor units connected in series (i.e., R3a and R3b) may be symmetrical with respect to a second center point O2, and the at least two fourth-sensing-resistor units connected in series (i.e., R4a and R4b) may be symmetrical with respect to the second center point O2.

It should be noted that, in the touch control display panel shown in FIG. 7a, the number of the sensing-resistor units included in each sensing resistor, and the positions of the first sensing resistor R1, the second sensing resistor R2, the third sensing resistor R3 and the fourth sensing resistor R4 are only for illustrative purposes and are not intended to limit the scope of the present disclosure.

Figure 7B:
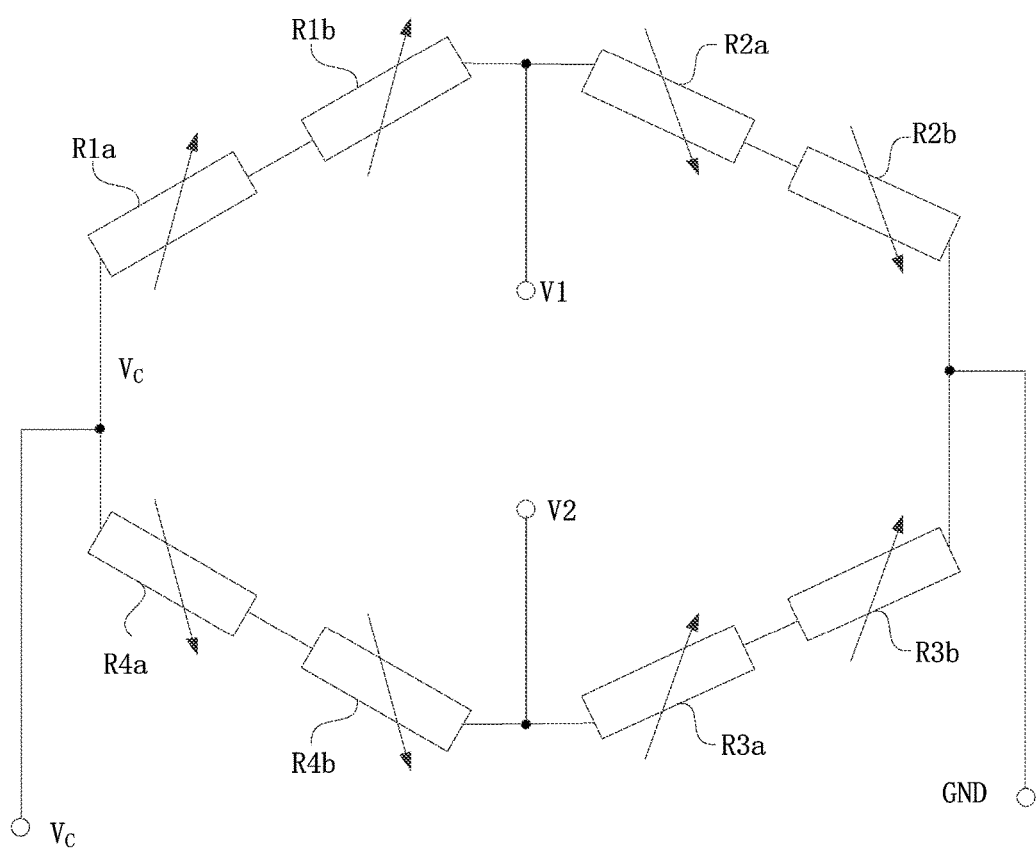
FIG. 7b illustrates an equivalent circuit diagram of a force sensing bridge in another exemplary touch control display panel in FIG. 7a consistent with disclosed embodiments.

FIG. 7b illustrates an equivalent circuit diagram of a force sensing bridge in another exemplary touch control display panel in FIG. 7a consistent with disclosed embodiments. The similarities between FIG. 7b and FIG. 4 are not repeated here, while certain differences may be explained.

As shown in FIG. 7a and FIG. 7b, the first sensing resistor R1 may include at least two first-sensing-resistor units connected in series: R1a and R1b, and the second sensing resistor R2 may include at least two second-sensing-resistor units connected in series: R2a and R2b. Comparing FIG. 3 and FIG. 7a, when the other parameters are the same, the first-sensing-resistor units R1a and R1b in FIG. 7a, as a portion of the first sensing resistor R1, may have a smaller distribution area than the first sensing resistor R1 in FIG. 3, respectively. Similarly, the second-sensing-resistor units R2a and R2b in FIG. 7a, as a portion of the second sensing resistor R2, may have a smaller distribution area than the second sensing resistor R2 in FIG. 3, respectively.

Thus, R1a and R2a (or R2b) in FIG. 7a may have a smaller distribution area than the second sensing resistor R2 and the first sensing resistor R1 in FIG. 3, and R1b and R2b (or R2a) in FIG. 7a may also have a smaller distribution area than the second sensing resistor R2 and the first sensing resistor R1 in FIG. 3. Thus, the temperature difference between R1a and R2a (or R2b), and the temperature difference between R1b and R2b (or R2a) may be further reduced. That is, the temperature effect in measuring the applied external force may be further reduced, and the accuracy of the force touch may be further improved.

Similarly, the third sensing resistor R3 may include at least two third-sensing-resistor units connected in series: R3a and R3b, and the fourth sensing resistor R4 may include at least two fourth-sensing-resistor units connected in series: R4a and R4b. Comparing FIG. 7a and FIG. 3, when the other parameters are the same, the third-sensing-resistor units R3a and R3b in FIG. 7a, as a portion of the third sensing resistor R3, may have a smaller distribution area than the third sensing resistor R3 in FIG. 3, respectively. Similarly, the fourth-sensing-resistor units R4a and R4b, as a portion of the fourth sensing resistor R4 in FIG. 7a, may have a smaller distribution area than the fourth sensing resistor R4 in FIG. 3, respectively.

Thus, R3a and R4a (or R4b) in FIG. 7a may have a smaller distribution area than the fourth sensing resistor R4 and the third sensing resistor R3 in FIG. 3, and R3b and R4b (or R4a) in FIG. 7a may also have a smaller distribution area than the fourth sensing resistor R4 and the third sensing resistor R3 in FIG. 3. Thus, the temperature difference between R3*a* and R4*a* (or R4*b*), and the temperature difference between R3*b* and R4*b* (or R4*a*) may be further reduced. That is, the temperature effect in measuring the applied external force may be further reduced, and the accuracy of the force touch may be further improved.

In one embodiment, as shown in FIG. 7*a* and FIG. 7*b*, the first sensing resistor, the second sensing resistor, the third sensing resistor, and the fourth sensing resistor may be disposed in the same layer. In another embodiment, the first sensing resistor, the second sensing resistor, the third sensing resistor, and the fourth sensing resistor may be disposed in different layers, for example, as shown in FIG. 8*a* and FIG. 8*b*.

Figure 8A:
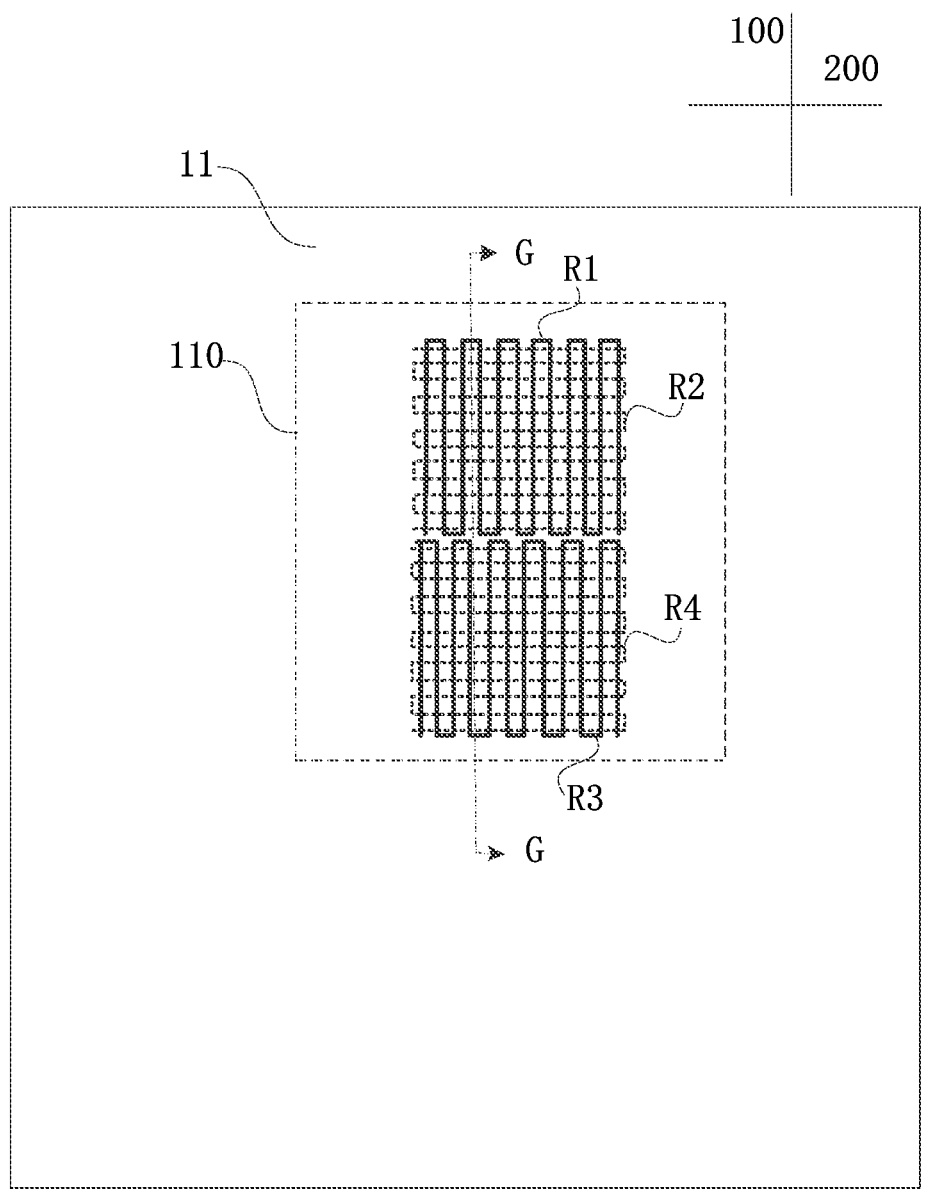
FIG. 8a illustrates a partial diagram of another exemplary touch control display panel consistent with disclosed embodiments.

FIG. 8*a* illustrates a partial diagram of another exemplary touch control display panel consistent with disclosed embodiments. FIG. 8*b* illustrates a G-G sectional view of an exemplary touch control display panel in FIG. 8*a* consistent with disclosed embodiments. The similarities between FIG. 8*a* and FIG. 3 are not repeated here, while certain differences may be explained.

Figure 8B:
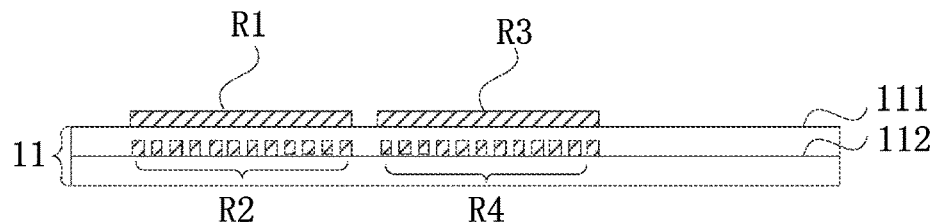
FIG. 8b illustrates a sectional view of an exemplary touch control display panel in FIG. 8a along the G-G direction consistent with disclosed embodiments.

As shown in FIG. 8*a* and FIG. 8*b*, the first sensing resistor R1 and the third sensing resistor R3 may be disposed in a first layer 111, while the second sensing resistor R2 and the fourth sensing resistor R4 may be disposed in a second layer 112 different from the first layer 111. Thus, the first sensing resistor R1 and the second sensing resistor R2 may be disposed in a substantially small area or a same area, and the third sensing resistor R3 and the fourth sensing resistor R4 may be disposed in a substantially small area or a same area. That is, the temperature effect in measuring the applied external force may be reduced, and the accuracy of the force touch may be improved.

In particular, an orthogonal projection of the first sensing resistor R1 onto the substrate 11 may be overlapped with an orthogonal projection of the second sensing resistor R2 onto the substrate 11. Meanwhile, an orthogonal projection of the third sensing resistor R3 onto the substrate 11 may be overlapped with an orthogonal projection of the fourth sensing resistor R4 onto the substrate 11.

In one embodiment, as shown in FIG. 8*a* and FIG. 8*b*, the orthogonal projection of the first sensing resistor R1 onto the substrate 11 may be fully overlapped with the orthogonal projection of the second sensing resistor R2 onto the substrate 11, and the orthogonal projection of the third sensing resistor R3 onto the substrate 11 may be fully overlapped with the orthogonal projection of the fourth sensing resistor R4 onto the substrate 11. Thus, the first sensing resistor R1 and the second sensing resistor R2 may be confined in a substantially small area or a same area, and the third sensing resistor R3 and the fourth sensing resistor R4 may also be confined in a substantially small area or a same area, experiencing a substantially same temperature change. Accordingly, the temperature effect in measuring the applied external force may be reduced, and the accuracy of the force touch may be improved.

In another embodiment, the orthogonal projection of the first sensing resistor R1 onto the substrate 11 may be at least partially overlapped with the orthogonal projection of the second sensing resistor R2 onto the substrate 11, and the orthogonal projection of the third sensing resistor R3 onto the substrate 11 may be at least partially overlapped with the orthogonal projection of the fourth sensing resistor R4 onto the substrate 11.

Figure 9:
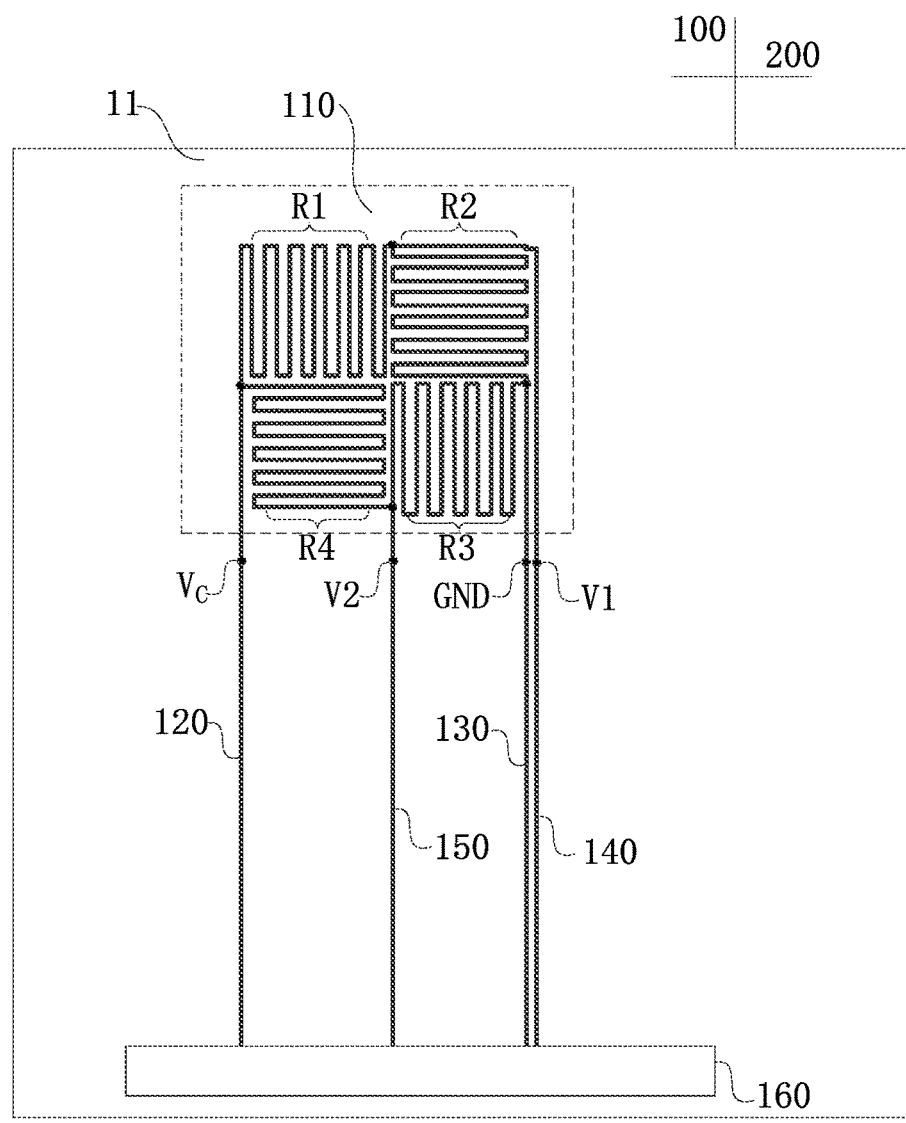
FIG. 9 illustrates a partial diagram of another exemplary touch control display panel consistent with disclosed embodiments.

FIG. 9 illustrates a partial diagram of another exemplary touch control display panel consistent with disclosed embodiments. The similarities between FIG. 9 and FIG. 3 are not repeated here, while certain differences may be explained. As shown in FIG. 9, the touch panel display may further include at least two driving lines 120 and 130, and at least two detecting lines 140 and 150. The two driving lines 120 and 130 may be electrically connected to the input terminal Vc of the first power source and the input terminal GND of the second power source, respectively, while the two detecting lines 140 and 150 may be electrically connected to the first sensing signal measurement terminal V1 and the second sensing signal measurement terminal V2, respectively.

Further, the touch control display panel may also include a driving chip 160, which may be electrically connected to the driving lines 120 and 130 and the detecting lines 140 and 150, respectively. In an operation state, the driving chip 160 may input an eclectic signal to the input terminal Vc of the first power source and the input terminal GND of the second power source through the driving lines 120 and 130, respectively. Meanwhile, the driving chip 160 may obtain the output signal between the first sensing signal measurement terminal V1 and the second sensing signal measurement terminal V2, based on which the magnitude of the touch force applied on to the substrate 11 may be calculated.

It should be noted that, the position of the driving chip 160 in FIG. 9 is for illustrative purposes and is not intended to limit the scope of the present disclosure.

In addition, the first sensing resistor R1, the second sensing resistor R2, the third sensing resistor R3, and the fourth sensing resistor R4 may be made of metals. In one embodiment, the first sensing resistor R1, the second sensing resistor R2, the third sensing resistor R3, and the fourth sensing resistor R4 may be made of non-transparent metals (i.e., opaque metals), and the force sensing bridge 110 may be disposed in a non-display region of the touch control display panel. In another embodiment, the first sensing resistor R1, the second sensing resistor R2, the third sensing resistor R3, and the fourth sensing resistor R4 may be made of non-transparent metals (i.e., opaque metals), and the force sensing bridge 110 may be disposed in a non-transparent area or light-shielding area of a display region of the touch control display panel.

In another embodiment, the first sensing resistor R1, the second sensing resistor R2, the third sensing resistor R3, and the fourth sensing resistor R4 may be made of transparent metals, for example, indium tin oxide (ITO), and the force sensing bridge 110 may be disposed on any appropriate area of the touch control display panel. Thus, the force sensing bridge 110 may have more freedom to be disposed on the touch control display panel, without affecting the image displayed by the touch control display panel.

In the disclosed embodiments, the touch control display panel may be any appropriate touch control display panel capable of displaying videos and/or images, such as a plasma display panel (PDP) touch control display panel, a field emission display (FED) touch control display panel, a liquid crystal display (LCD) touch control display panel, an organic light-emitting diode (OLED) touch control display panel, a light-emitting diode (LED) touch control display panel, a quantum dots (QDs) touch control display panel, an electrophoretic touch control display panel (i.e., e-readers) or other types of touch control display panel.

Figure 10:
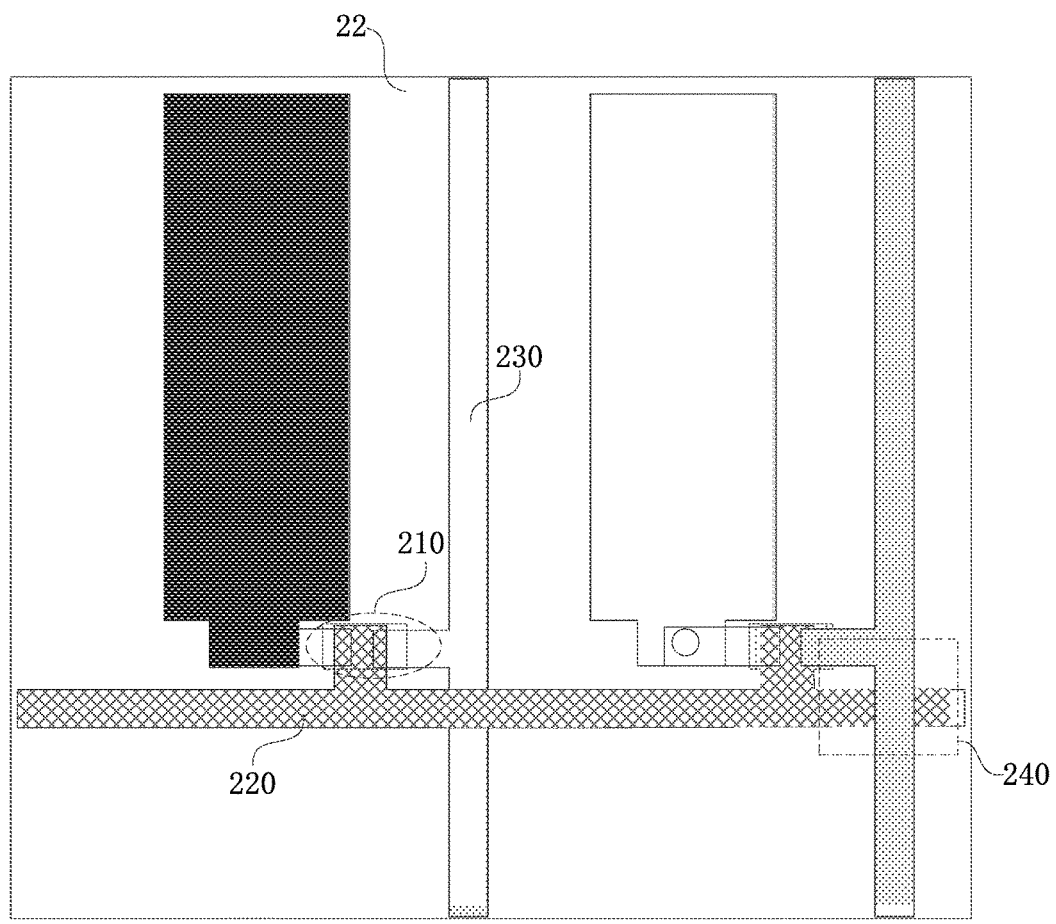
FIG. 10 illustrates an enlarged partial diagram of another exemplary touch control display panel in which the substrate is an array substrate consistent with disclosed embodiments.

When the touch control display panel is a liquid crystal display (LCD) touch control display panel, an organic light-emitting diode (OLED) touch control display panel, the substrate in the disposed touch control display panel may be an array substrate or a color film substrate. FIG. 10 illustrates an enlarged partial diagram of another exemplary touch control display panel having an array substrate consistent with disclosed embodiments.

As shown in FIG. 10, the touch control display panel may include a substrate, which may be an array substrate 22. The array substrate 22 may include a plurality of switches 210, a plurality of scanning liens 220, and plurality of data lines 230. Other components may also be included. The switches 210, the scanning lines 220, and the data lines 230 may be disposed in a non-transparent area or light-shielding area of a display region of the touch control display panel. The force sensing bridge may also be disposed in the non-transparent area of the display region of the touch control display panel.

When the array substrate 22 is adopted to fabricate an LCD touch control display panel, given that a black matrix for suppressing the light leakage in each pixel unit is often disposed on the color film substrate in a current LCD touch control display panel, the force sensing bridge may be disposed in the non-transparent area of the display region of the array substrate 22. The non-transparent area may correspond to corresponding to a light-shielding area of the black matrix between the pixel units. That is, an orthogonal projection of the force sensing bridge on the array substrate 22, may fall within, an orthogonal projection of the light-shielding area of the black matrix between the pixel units onto the array substrate 22. For example, in one embodiment, as shown in FIG. 10, the force sensing bridge may be disposed in an area denoted by a dashed rectangle 240. Thus, the light transmittance of the LCD touch control display panel may not be affected by the force sensing bridge.

Figure 11:
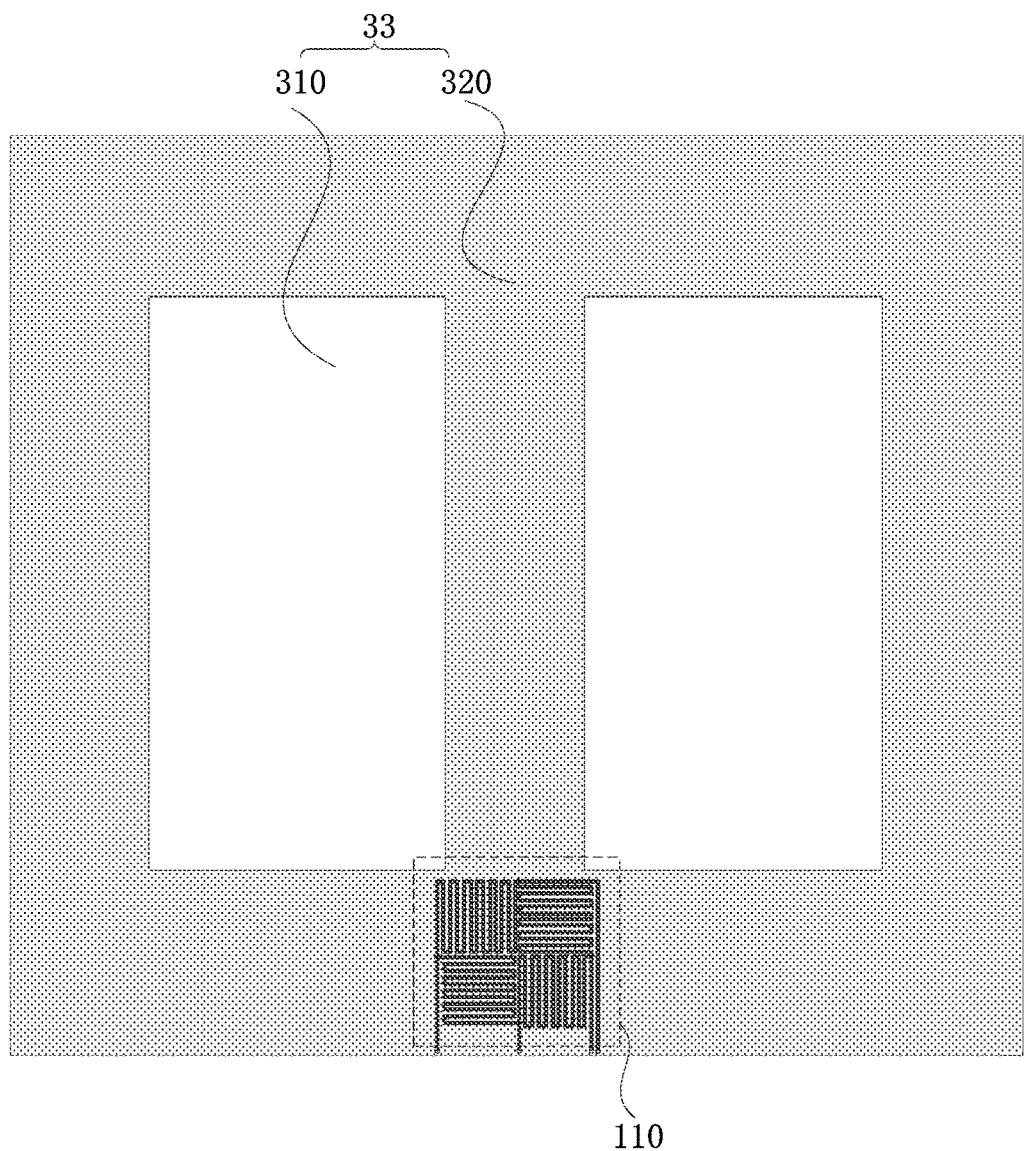
FIG. 11 illustrates an enlarged partial diagram of another exemplary touch control display panel in which the substrate is a color film substrate consistent with disclosed embodiments.

FIG. 11 illustrates an enlarged partial diagram of another exemplary touch control display panel having a color film substrate consistent with disclosed embodiments. As shown in FIG. 11, the touch control display panel may include a substrate, which may be a color film substrate 33. The color film substrate 33 may include a black matrix 320 and a plurality of color filters 310, and the force sensing bridge 110 may be disposed in a region having the black matrix 320. Other components may also be included.

It should be noted that, as shown in FIG. 10 and FIG. 11, the force sensing bridge may be disposed in the display region of the touch control display panel, and the positions of the force sensing bridge in FIG. 10 and FIG. 11 are for illustrative purposes and is not intended to limit the scope of the present disclosure. In certain embodiments, the force sensing bridge may be disposed in the non-display region of the touch control display panel. In certain embodiments, the force sensing bridge may be disposed in both the non-display region and the display region of the touch control display panel.

Figure 12:
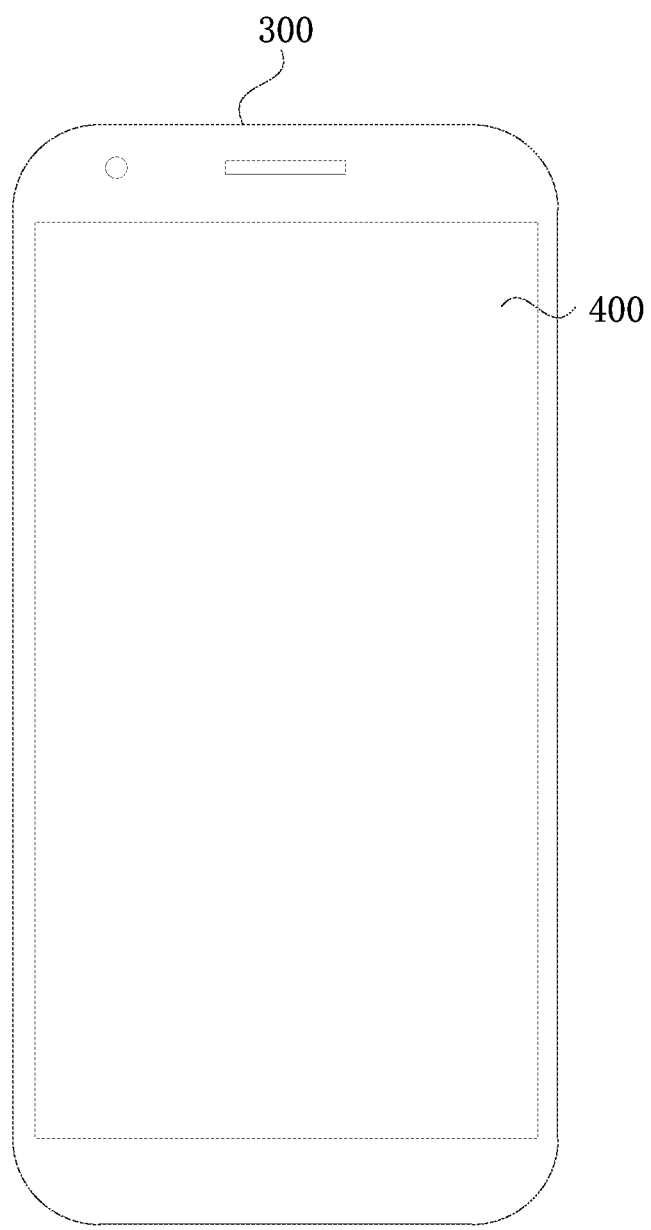
FIG. 12 illustrates an exemplary touch control display device consistent with disclosed embodiments.

The present disclosure further provides an improved touch control display device. FIG. 12 illustrates an exemplary touch control display device consistent with disclosed embodiments. As shown in FIG. 12, the touch control display device 300 may include a touch control display panel 400, which may be any of the disclosed touch control display panels. The disclosed touch control display device 300 may be a smart wearable device, a tablet, a TV, a smartphone, a notebook, and, a digital frame, etc. Further, the touch control display device 300 may be any appropriate type of content-presentation devices. Because the disclosed touch control display device 300 includes any of the disclosed touch control display panels, the disclosed touch control display device 300 may also exhibit the same advantages as the disclosed touch control display panels, which are not repeated here.

In the disclosed embodiments, the touch control display panel may include at least one force sensing bridge, which may detect the strain along the first extending direction through the first sensing resistor and the third sensing resistor, and detect the strain along the second extending direction through the second sensing resistor and the fourth sensing resistor. At least the resistors in a same leg of the force sensing bridge may be disposed in a same area, or at least confined in a substantially small area on the touch control display panel, in which a local temperature of the resistors may be the same or substantially the same.

That is, the first sensing resistor and the second sensing resistor may be disposed in a same area, or at least confined in a substantially small area on the touch control display panel, in which the local temperature change may be the same or substantially the same. Meanwhile, the third sensing resistor and the fourth sensing resistor may be disposed in a same area or confined in a substantially small area, in which the local temperature change may be the same or substantially the same. Thus, the temperature of the first sensing resistor and the second sensing resistor may be changed simultaneously, and the temperature of the third sensing resistor and the fourth sensing resistor may be changed simultaneously. The temperature effect in measuring the external force applied on to the touch control display panel may be reduced, while the strains in the substrate may be successfully detected, and the accuracy of the force touch may be improved.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A touch control display panel, comprising:
   a first substrate having a first extending direction and a second extending direction intersecting the first extending direction;
   a second substrate opposing the first substrate; and
   at least one force sensing bridge including a first sensing resistor, a second sensing resistor, a third sensing resistor, and a fourth sensing resistor,
   wherein:
   a first end of the first sensing resistor and a first end of the fourth sensing resistor are electrically connected to an input terminal of a first power supply, respectively,
   a second end of the first sensing resistor and a first end of the second sensing resistor are electrically connected to a first sensing signal measurement terminal, respectively,
   a second end of the fourth sensing resistor and a first end of the third sensing resistor are electrically connected to a second sensing signal measurement terminal, respectively,
   a second end of the second sensing resistor and a second end of the third sensing resistor are electrically connected to an input terminal of a second power supply, respectively,
   from the first end of the first sensing resistor to the second end of the first sensing resistor, the first sensing resistor has a longer extending length in the first extending direction than in the second extending direction,
   from the first end of the second sensing resistor to the second end of the second sensing resistor, the second sensing resistor has a longer extending length in the second extending direction than in the first extending direction, from the first end of the third sensing resistor to the second end of the third sensing resistor, the third sensing resistor has a longer extending length in the first extending direction than in the second extending direction, from the first end of the fourth sensing resistor to the second end of the fourth sensing resistor, the fourth sensing resistor has a longer extending length in the second extending direction than in the first extending direction, the first sensing resistor and the third sensing resistor are disposed in a first layer, the second sensing resistor and the fourth sensing resistor are disposed in a second layer different from the first layer, an orthogonal projection of the first sensing resistor onto the first substrate is overlapped with an orthogonal projection of the second sensing resistor onto the first substrate, an orthogonal projection of the third sensing resistor onto the first substrate is overlapped with an orthogonal projection of the fourth sensing resistor onto the first substrate, and the first substrate includes a plurality of data lines and a plurality of scanning lines intersecting the plurality of data lines, the at least one force sensing bridge is disposed in a light-shielding area corresponding to an intersection between one of the plurality of data lines and one of the plurality of scanning lines, and an orthogonal projection of the at least one force sensing bridge onto the first substrate is within an orthogonal projection of the light-shielding area onto the first substrate.

2. The touch control display panel according to claim 1, wherein:
the first extending direction is perpendicular to the second extending direction.

3. The touch control display panel according to claim 1, wherein:
the first substrate has a rectangular shape;
the first extending direction is along a long side of the rectangular shape;
and the second extending direction is along a short side of the rectangular shape.

4. The touch control display panel according to claim 1, wherein:
the first sensing resistor, the second sensing resistor, the third sensing resistor, and the fourth sensing resistor are made of metals.

5. The touch control display panel according to claim 4, wherein:
the metals include indium tin oxide (ITO).

6. The touch control display panel according to claim 1, wherein:
the first sensing resistor, the second sensing resistor, the third sensing resistor, and the fourth sensing resistor have a same initial resistance.

7. The touch control display panel according to claim 6, wherein:
at least one of the first sensing resistor, the second sensing resistor, the third sensing resistor, and the fourth sensing resistor has a folded linear structure.

8. The touch control display panel according to claim 1, further including:
at least two driving lines disposed on the first substrate, and electrically connected to the input terminal of the first power supply and the input terminal of the second power supply, respectively; and
at least two detecting lines disposed on the first substrate, and electrically connected to the first sensing signal measurement terminal and the second sensing signal measurement terminal, respectively.

9. The touch control display panel according to claim 1, wherein:
the first substrate is an array substrate including a plurality of switches; and
the second substrate is a color film substrate including a plurality of color filters.

10. A touch control display panel, comprising:
a substrate having a first extending direction and a second extending direction intersecting the first extending direction; and
at least one force sensing bridge including a first sensing resistor, a second sensing resistor, a third sensing resistor, and a fourth sensing resistor,
wherein:
a first end of the first sensing resistor and a first end of the fourth sensing resistor are electrically connected to an input terminal of a first power supply, respectively,
a second end of the first sensing resistor and a first end of the second sensing resistor are electrically connected to a first sensing signal measurement terminal, respectively,
a second end of the fourth sensing resistor and a first end of the third sensing resistor are electrically connected to a second sensing signal measurement terminal, respectively,
a second end of the second sensing resistor and a second end of the third sensing resistor are electrically connected to an input terminal of a second power supply, respectively,
from the first end of the first sensing resistor to the second end of the first sensing resistor, the first sensing resistor has a longer extending length in the first extending direction than in the second extending direction,
from the first end of the second sensing resistor to the second end of the second sensing resistor, the second sensing resistor has a longer extending length in the second extending direction than in the first extending direction,
from the first end of the third sensing resistor to the second end of the third sensing resistor, the third sensing resistor has a longer extending length in the first extending direction than in the second extending direction, and
from the first end of the fourth sensing resistor to the second end of the fourth sensing resistor, the fourth sensing resistor has a longer extending length in the second extending direction than in the first extending direction,
wherein:
the first sensing resistor, the second sensing resistor, the third sensing resistor, and the fourth sensing resistor are disposed in a same layer,
the first sensing resistor includes at least two first-sensing-resistor units connected in series,
the second sensing resistor includes at least two second-sensing-resistor units connected in series, each of the at least two first-sensing-resistor units and each of the at least two second-sensing-resistor units are alternately arranged in both the first extending direction and the second extending direction, the at least two first-sensing-resistor units connected in series are point symmetrical with respect to a first center point, and the at least two second-sensing-resistor units connected in series are point symmetrical with respect to the first center point.

11. The touch control display panel according to claim 10, wherein:

the third sensing resistor includes at least two third-sensing-resistor units connected in series; and the fourth sensing resistor includes at least two fourth-sensing-resistor units connected in series.

12. The touch control display panel according to claim 11, wherein:

each of the at least two third-sensing-resistor units connected in series and each of the at least two fourth-sensing-resistor units connected in series are alternately arranged in both the first extending direction and the second extending direction, the at least two third-sensing-resistor units connected in series are point symmetrical with respect to a second center point, and the at least two fourth-sensing-resistor units connected in series are point symmetrical with respect to the second center point.

13. The touch control display panel according to claim 10, wherein:

a distance between a first point and a second point is approximately 0.1 mm~5 mm, wherein the first point is a farthest point of the first sensing resistor away from the second sensing resistor, and the second point is a farthest point of the second sensing resistor away from the first sensing resistor; and a distance between a third point and a fourth point is approximately 0.1 mm~5 mm, wherein the third point is a farthest point of the third sensing resistor away from the fourth sensing resistor, and the fourth point is a farthest point of the fourth sensing resistor away from the third sensing resistor.

14. The touch control display panel according to claim 10, further including:

at least two driving lines disposed on the substrate, and electrically connected to the input terminal of the first power supply and the input terminal of the second power supply, respectively; and at least two detecting lines disposed on the substrate, and electrically connected to the first sensing signal measurement terminal and the second sensing signal measurement terminal, respectively.

15. The touch control display panel according to claim 10, wherein:

the first sensing resistor, the second sensing resistor, the third sensing resistor, and the fourth sensing resistor have a same initial resistance.

16. The touch control display panel according to claim 15, wherein:

at least one of the first sensing resistor, the second sensing resistor, the third sensing resistor, and the fourth sensing resistor has a folded linear structure.

17. A touch control display device, comprising:
a touch control display panel,
wherein the touch control display panel comprises:

a substrate having a first extending direction and a second extending direction intersecting the first extending direction;

at least one force sensing bridge including a first sensing resistor, a second sensing resistor, a third sensing resistor, and a fourth sensing resistor, wherein:

a first end of the first sensing resistor and a first end of the fourth sensing resistor are electrically connected to an input terminal of a first power supply, respectively, a second end of the first sensing resistor and a first end of the second sensing resistor are electrically connected to a first sensing signal measurement terminal, respectively, a second end of the fourth sensing resistor and a first end of the third sensing resistor are electrically connected to a second sensing signal measurement terminal, respectively, a second end of the second sensing resistor and a second end of the third sensing resistor are electrically connected to an input terminal of a second power supply, respectively, from the first end of the first sensing resistor to the second end of the first sensing resistor, the first sensing resistor has a longer extending length in the first extending direction than in the second extending direction, from the first end of the second sensing resistor to the second end of the second sensing resistor, the second sensing resistor has a longer extending length in the second extending direction than in the first extending direction, from the first end of the third sensing resistor to the second end of the third sensing resistor, the third sensing resistor has a longer extending length in the first extending direction than in the second extending direction, from the first end of the fourth sensing resistor to the second end of the fourth sensing resistor, the fourth sensing resistor has a longer extending length in the second extending direction than in the first extending direction, wherein:

the first sensing resistor, the second sensing resistor, the third sensing resistor, and the fourth sensing resistor are disposed in a same layer, the first sensing resistor includes at least two first-sensing-resistor units connected in series, the second sensing resistor includes at least two second-sensing-resistor units connected in series, each of the at least two first-sensing-resistor units and each of the at least two second-sensing-resistor units are alternately arranged in both the first extending direction and the second extending direction, the at least two first-sensing-resistor units connected in series are point symmetrical with respect to a first center point, and the at least two second-sensing-resistor units connected in series are point symmetrical with respect to the first center point.

18. The touch control display device according to claim 17, wherein:

the first extending direction is perpendicular to the second extending direction.

19. The touch control display device according to claim 17, wherein:

the substrate has a rectangular shape;

the first extending direction is along a long side of the rectangular shape;

and the second extending direction is along a short side of the rectangular shape.

20. The touch control display device according to claim 17, wherein:

a distance between a first point and a second point is approximately 0.1 mm~5 mm, wherein the first point is a farthest point of the first sensing resistor away from the second sensing resistor, and the second point is a farthest point of the second sensing resistor away from the first sensing resistor; and a distance between a third point and a fourth point is approximately 0.1 mm~5 mm, wherein the third point is a farthest point of the third sensing resistor away from the fourth sensing resistor, and the fourth point is a farthest point of the fourth sensing resistor away from the third sensing resistor.

\* \* \* \* \*